O. W. BENSTER.
AIRSHIP PROPELLING, SUPPORTING, AND LANDING MECHANISM.
APPLICATION FILED NOV. 1, 1918.

1,430,880.

Patented Oct. 3, 1922.
3 SHEETS—SHEET 2.

Inventor:
Olin Wendell Benster

Patented Oct. 3, 1922.

1,430,880

UNITED STATES PATENT OFFICE.

OLIN WENDELL BENSTER, OF TOLEDO, OHIO.

AIRSHIP PROPELLING, SUPPORTING, AND LANDING MECHANISM.

Application filed November 1, 1918. Serial No. 260,760½.

*To all whom it may concern:*

Be it known that I, OLIN WENDELL BENSTER, a citizen of the United States, and a resident of Toledo, in the county of Lucas and the State of Ohio, have invented a certain new and useful Airship Propelling, Supporting, and Landing Mechanism; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to an air ship mechanism which is especially designed to work or fly in high winds, and the invention contemplates a construction for utilizing the wind and resistant air pressure power as a propelling and supporting means, either in combination with or independent of the power derived from the engine carried by the air ship.

The invention has for its object:

First. To construct an air ship mechanism for getting into the air and also landing in small or rough places, as well as being able to start and stop in the air, and should the engine stop, be assured of a safe landing, by means of the rotary parachute raising blades, driven by the engine, wind and resistant air pressure power, by means of a combined power sail and co-acting peripheral air propelling blades and rotary combined plane, parachute, resistant air pressure or resistant air pressure power sail blades and co-acting peripheral raising blades.

Second. To construct an air ship mechanism which will land by mechanical means when all powers except resistant air pressure or wind pressure has ceased, or is not in control of the aviator.

Third. To arrange and combine the different propelling, raising and lowering powers, either or all, singly or in combination, so as to operate or move the ship in the air.

Fourth. To construct a rotary parachute combination to operate raising blades and means for an operative air housing device,— the housed air to operate the parachute combination power sail and co-acting raising blades and mechanism, and to make said mechanism convertible into a power driving mechanism.

Fifth. To construct an air ship which will be propelled by wind power when necessary and to convert the resistant air pressure as well as wind pressure into propelling and raising power.

My invention embodies the novel combination and arrangement of parts herein described and claimed, reference being had to the accompanying drawings, in which:

Figures 1, 3, 9, 11, 12:
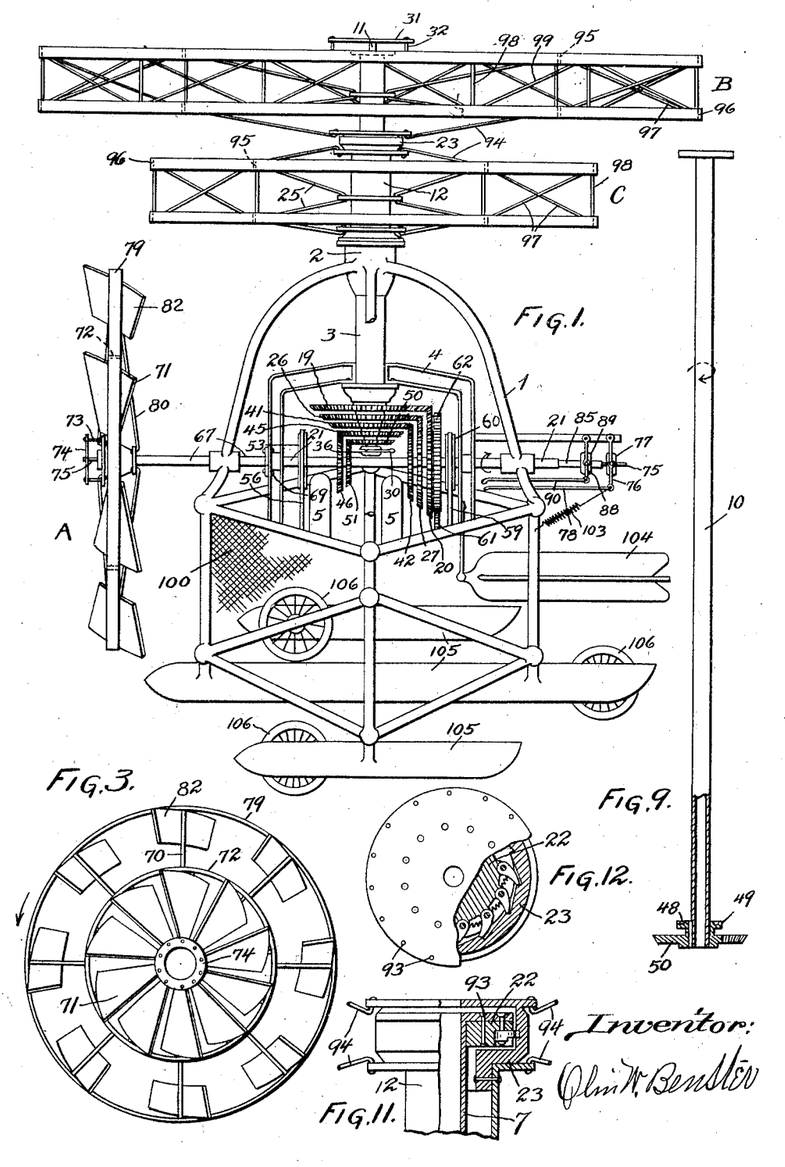
Figure 1, is a general view of my invention, the parachute wheels and combination sail and propeller wheel being shown in part section. In this view the power and raising blades of the parachute wheels are not shown, to avoid confusion.
Figure 3, is a face view of the combination sail and propeller wheel.
Figures 6, 7, 8 and 9, are detached views of the concentric shafts connecting with the parachute wheels.
Figure 11, is a sectional detail of the pawling device at the upper ends of the concentric shafts, 7, 8, 9 and 10 to pawl the hubs 12 and 29 of the parachute wheels B and C, at the top end of their adjoining shafts and at the top end of each of the compound hub flanges.
Figure 12, is a plan view partly in section of Figure 11.
Figures 4, 5, 6, 7, 8, 10:
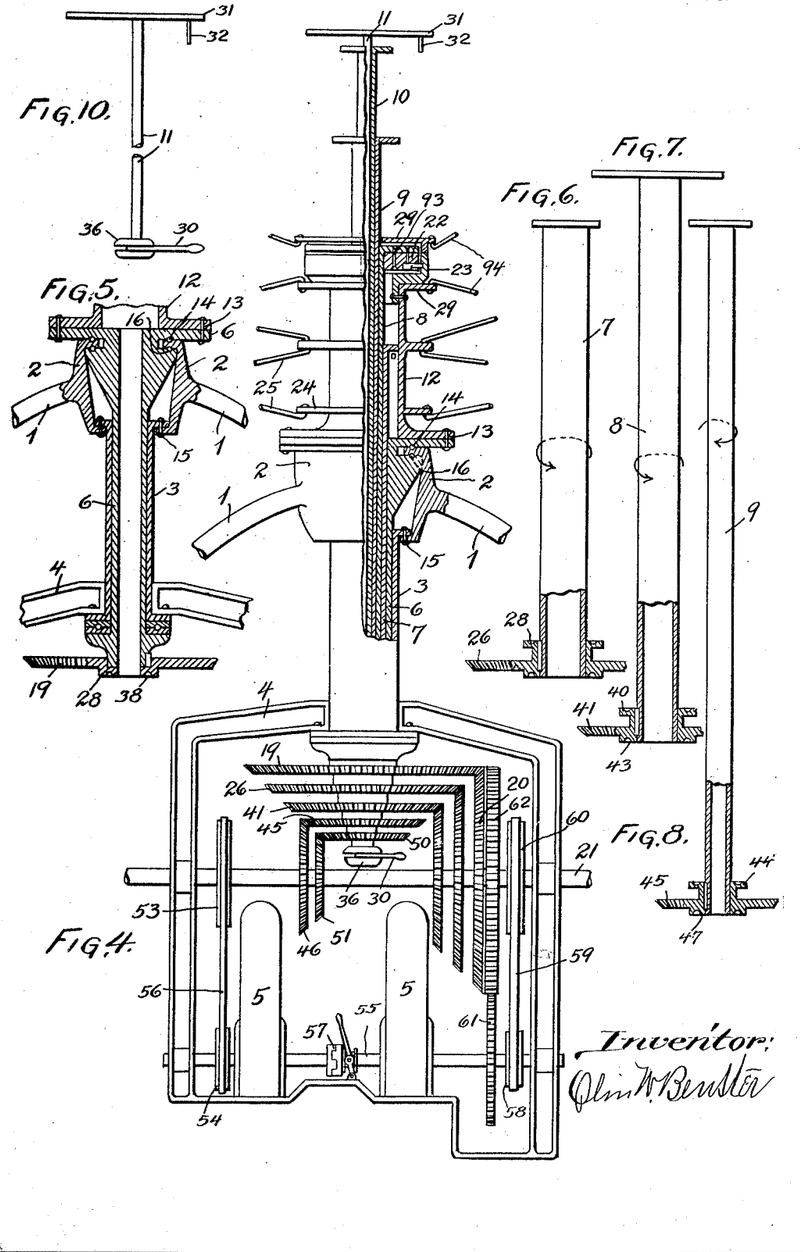
Figure 4, is a sectional elevation showing the arrangement of the concentric parachute wheel shafts, the engine and its supporting means, and also showing the interconnecting mechanism between the parachute wheels and combination sail and propeller wheel and the engine.
Figure 5, is an enlarged sectional detail of the antifriction track way plate 28, shaft 6, tube 3, yoke 2 and frame 4.
Figure 10, is a detail view of the means for opening and closing the gates of the parachute wheel B.

Referring to the drawings 1 designates the carriage frame connected to the yoke 2, a tube 3 connecting the frame with the frame work 4 of the engines 5, 5. The yoke 2 and tube 3 and engine frame work 4, in this instance support the concentric tubular shafts 6, 7, 8, 9 and 10, and the tube 3, and the said shafts, which makes the supporting mechanism for the parachute wheels B and C and means by which they are rotated and operated. They may free themselves by the pawls (Figures 11 and 12) and may freely revolve around and are steadied thereby and the tubular shafts 6, 7, 8, 9 and 10 may simultaneously be operated and revolved to drive the parachute wheels B and C, the hub 12—12 (Figures 1, 4 and 5) of the parachute wheel C being supported or carried when at rest by the tubular shaft 6, riveted at 13 (Figures 4 and 5) to the flange of the shaft 6. The carriage 1 and engine frame work 4, jointly supporting the shaft 6, the former by the means of the ball bearings 14 and 16 in the yoke 2 and through the yoke 2 and carriage frame work 1 and the said shaft 6, revolving or bearing jointly within the yoke 2 on ball bearings 14 and 16 within said yoke 2 and also journalled within the tube 3. Tube 3 is riveted to the yoke 2 at 15 and to the engine frame work at 37 (Figure 5). Thus the tube 3 delivers its load to the latter frame work 4 and carries jointly with the carriage the lifting thrust of the aforesaid parachute wheel C, through its hub (12—12) riveted to the top of the tubular shaft 6 at 13 (Figures 4 and 5) causing the shaft 6 to raise, bringing jointly into contact the ball bearings 16 within the yoke 2 and the ball bearings 17 tracked into the ring plate 18 (Figures 5 and 6), the said plate 18 bearing against the flange of the tube 3 and which raises jointly or together the carriage 1 and engine frame work 4. This combination guards against any fall by breakage of any of the carrying parts of the carriage and shafting. Suitably secured on the lower part of shaft 6, is a beveled gear 19 meshing in its train, the beveled gear 20 clutched onto the main power shaft 21 and on the extreme lower end of said shaft 6, is a flanged ring plate 28, bearing a track-way and ball bearings 38 (Figures 5 and 6) and matching the track-way in the ring plate on the hub of the gear 26 (Figure 6) which is rigidly fastened to shaft 7 (Figure 6). The hubs of both of the parachute wheels B and C are made each of them in two sections, sufficiently spaced to admit of the flanges of the central perpendicular driving shaft ending therein and the pawling mechanism shown in Figures 11 and 12, this all being surrounded by a cylinder or separator to keep the two sections apart, when they are bolted together to make one hub. The tubular shaft 7 (Figures 6 and 4) journaled and rotating within shaft 6 extends upwardly beyond the shaft 6, to the center or between the upper and lower section of the two sections of a hub 12—12, of the parachute wheel C and on the upper side of the top flange of the lower section is the pawl and said shaft 7 is rigidly fastened to the male (22) part of the pawling mechanism shown in (Figures 11 and 12) and the female part 23 of the pawl is rigidly fastened to the top flange of the lower half of the hub 12, and the lower end of shaft 7 is rigidly fastened to the gear 26 (Figures 6 and 1) and meshing in train the gear 27 (Figure 1) clutched to the shaft 21, shaft 7 having a flanged plate on its lower extreme and trackway bearing the ball bearings 39 (Figure 6) tracked into the track-way of the ring plate 40 on shaft 8 (Figure 7). On the hub of the gear 41 and on the extreme lower end of shaft 8 is a flange plate 43 bearing ball bearings. The tubular shaft 8 (Figures 7 and 4) (see dotted lines $f$) revolves within shaft 7 and extends upward above the top flange of hub 12 and is pawled as described for shaft 7. On the lower end of shaft 8 is secured the ring plate 40, matching the ball bearing track-way in ring plate 39 on shaft 7. 41 is a beveled gear meshing in its train the beveled gear 42 on shaft 21. 43 is the flange ring plate and ball bearings matching the ring plate 44 on the hub of the gear 45 on the tubular shaft 9 (Figures 8 and 4) which is journaled and revolves within shaft 8 and extends upward above the top flange of the lower section of the hub 29 of parachute wheel B and is pawled to the hub 29 as described for shaft 7 by the pawling mechanism shown in (Figures 11 and 12) and suitably secured. 44 is the ring plate on the hub of the gear 45, matching the ring plate and rollers 43. 45 is a beveled gear, meshing in its train, the beveled gear 46 on shaft 21. 47 is a flange ring plate matching the hub ring plate 49 on gear 50. The tubular shaft 10 (Figures 9 and 4) (see dotted line $h$) is journaled and revolves within shaft 9 and extends upwardly to and beyond the top flange of the upper section of hub 29 of wheel B and is pawled to hub 29 as described for shaft 8 by the pawling mechanism shown in Figures 11 and 12. On the lower end of shaft 10, is suitably secured a tracked ring plate 49, matching the track-way or ball bearings 48 in the flange ring plate 47 on shaft 9 and is rigidly fastened on the lower end to the beveled gear 50, meshing in its train the beveled gear 51 on shaft 21 (Figure 1). The tube 11 (Figure 10), has an annularly grooved collar 36, rigidly fastened to its lower end and the said collar has a lever 30 loosely playing within said groove collar, allowing the tube 11 to turn, and for the purpose of operating up or down the wheel 31, (Figures 1 and 10). Mounted on the upper end of tube 11 is the said wheel 31 carrying a plurality of connecting rods 32, and said connecting rods are connected to the lower side of the gate blades 34, by staple-eyes, Figure 14. The said blades are hung on shafts 33 for the purpose of opening and closing the parachute wheel B to make a tight parachute or to open to allow the housed air to escape and act against the under side of the stationary power blades 35, to give revolution to the wheels B and C. The gate blades 34 in parachute wheel C are held by a spring 52 (Figure 14) and will not open until a required given resistant air pressure from under said wheel forces them automatically open, to cause said sail and parachute wheel C, to revolve the same as wheel B, but in the opposite direction, as further described and the stationary power blades 35 (Figures 2 and 14) are common to both parachute wheels B and C. The purpose of the power mechanism is to use the housed resistant air pressure when released and the ship is falling to actuate and put in rotation both the wheels B and C, to drive the co-acting raising blades 91 to retard the fall when other means have failed.

The engine power means to rotate the said wheels B and C and also wheel A, is the sprocket wheel 53 (Figure 4) clutched to the power driving shaft 21 and belted by the belt 56 to the sprocket 54, on shaft 55, furnishing the means of transferring the power from the engines 5—5, to the main power shaft 21. The second engine may run the above described train of transmission by the use of the clutch 57 on shaft 55. Said second engine runs directly sprocket 58, belt 59, and sprocket 60, clutched to shaft 21 and also gear 61, meshing with gear 62 clutched to gear 20 on shaft 21. Shaft 21 may receive power from the parachute wheel C, through the medium of the tubular shaft 6 riveted at 13 (Figure 5) to the hub 12 as hereafter described, when the air ship is falling, and also from the power sail wheel A, when the pawl 63 on hub 64, comes in contact with or pawls the said shaft 21 (Figure 3) by clutching the female part thereof on shaft 21 as hereafter described in operation.

Figures 2, 13, 14:
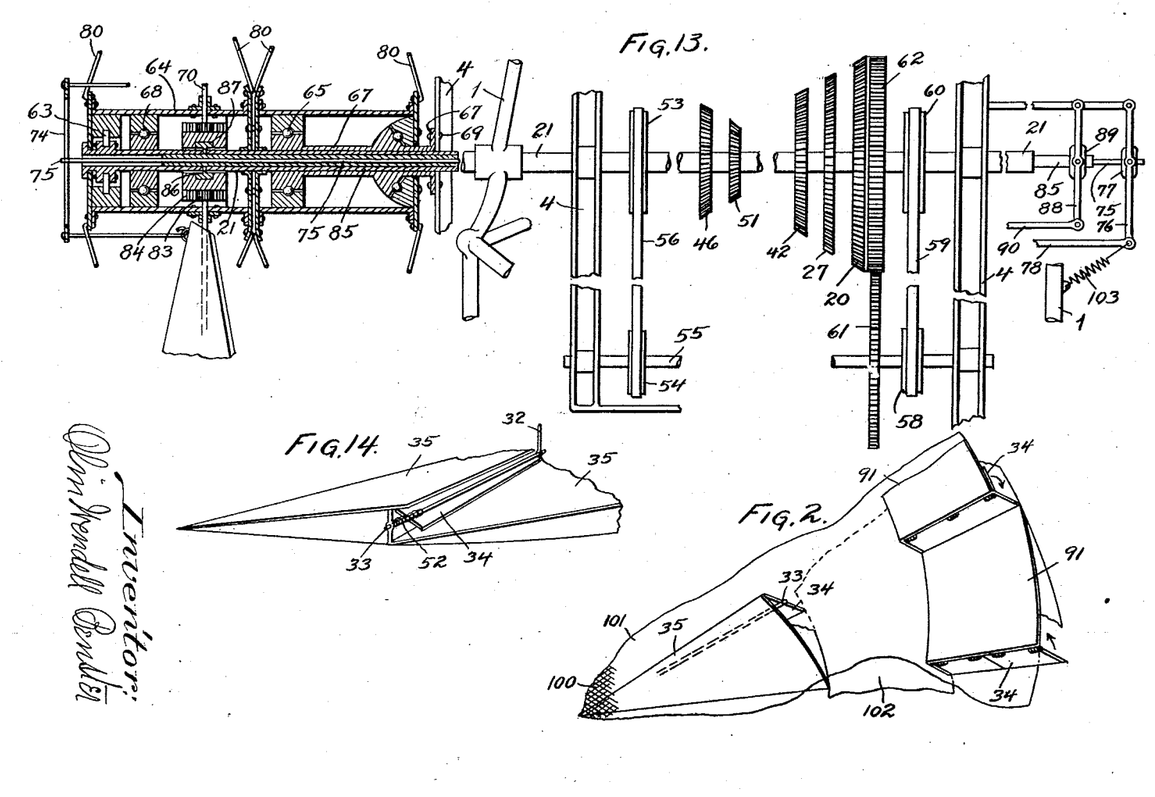
Figure 2, is a plan view, partly in section showing the arrangement of the blades in the parachute wheels.
Figure 13, is a sectional elevation, showing the main power shaft and showing the means for controlling the sail and propeller wheel.
Figure 14, is a fragmentary perspective view of the stationary power blades of the parachute wheels B and C, and the pivoted gates between the blades.

The hub 64 of the power sail wheel A, rests and revolves on the anti-friction rollers 65 and 66 on the stationary shaft 67. Shaft 67 is flanged and riveted at 69 to the engine frame work 4 (Figure 13). The wind power sail wheel and co-acting propeller combination, being an independent power and propeller mechanism, is journaled on the stationary shaft 67, by ball bearings 65 and 66 and also resting on the ball bearings 68 on shaft 21 at its extreme forward end, and the said power sail wheel A, consisting of a hub 64 and radial arms or shafts 70, extending therefrom and the said shafts 70 are securely fastened to the power sail tire 72 (Figure 3) and hub 64 and have hinged thereto the power blades 71. Each blade 71 has a connecting rod 73 connecting said blades 71, to the tire of the governor of the disc 74 (Figures 3 and 1), so that the blades 71 may be controlled and operated by the governor disc 74, connecting rod 75, collar 77 and lever 76 and operating lever 78 as well as being under the tension of the spring 103 (Figure 13). The disc 74 is securely, but rotatably fastened to the forward end of the governor and operating rod 75 that it may revolve with the said wheel A, and yet be pushed forward and backward, by the extreme wind-gusts or by maneuvering the lever 76 playing in the groove collar 77, on shaft 75 to change the angle of the blades 71 or speed of the wheel A. The wind-gusts drive leeward the governor 74 and connecting rods 75, opens the blades 71 on the sail wheel A and releases the sail blade 71 from an excess of wind pressure. There is a spring 103 connected to the lower end of lever 78 and the frame 1, on the tension of which depends the speed of the sail, causing the governor 74 to react after a wind-gust, to bring the blades 71 back to their normal position, for a uniform speed of the sail wheel A. The co-acting propeller combination of the sail A, consists of the outer tire 79 (Figure 3), the spokes 80 (Figure 1) and the shafts or arms 81 and the propeller blades 82, with the operating mechanism consisting of the rotatable arms 81, journaled at their outer ends in the tire 79 and on their inner ends within the arms 70 (Figures 3 and 13) on the hub 64 (Figure 13). Said arms 81 extend within said hub 64 a suitable distance to accommodate a gear wheel 83. Meshing in the multiple rack 84, the hub of which is loosely rotatable on the shaft 21 and said hub 84 has a trackway cut on its inner surface entirely around said hub to allow the roller 87 to pass freely as the hub and rack rotates with the hub 64. The said shaft 21 has a longitudinal slot cut therein to accommodate the pin or shaft 86, said pin 86 being securely fastened to the tube 85 operating the propeller blades 82, by shifting said rack 84 and gear 83 on the arm 81 (Figures 13 and 3) by means of the operating lever 90, as described for the operation of shaft 75. The shaft 21 comprises a tubular shaft mounted and journaled in the engine frame work 4, and the rear end is journaled on the carriage frame 1 (Figure 1). The forward part of shaft 21, is centrally located and journaled within the tubular shaft 67 (Figure 13) and protrudes a sufficient distance to carry a roller bearing 68 and the pawl 63, the female part thereof and also carries loosely the multiple rack hub 84, so that it may be shifted by the mechanism of the tube 85 in turning the gear 83 and arm 81 in changing the angle of the propeller blades 82, by the lever 88 and operating lever 90. There is also located within the shaft 21, the mechanism and tube 75 operating and shifting the said blades 71 by the means of the governor disc 74 and connecting rods 73. The said mechanism is manipulated by the lever 76 on tube 75 and operating lever 78 to put the said wheel A in and out of gear. The three power means to rotate the said shaft 21 has been heretofore given. The structure of said wheels B and C consists of two steel cylindrical tubes 29—29 and 12—12 and spaced in the middle by a cylindrical ring 92 (Figure 11) for a pawling mechanism within and bolted (93) together by their inner hub flanges, and radiating from said hub flanges are the wire spokes 94 (Figure 2) and their other ends are fastened to the tires 95 of the parachute power sail (Figures 2 and 1) and the peripheral tires 96, and the said tires 96 have a circumference twice that of tires 95 and have wire spokes 97, extending alternately from each of the tires 95, making each of said tires 95 a hub, for the extended portion of the wheel for the propeller mechanism. The other ends of the spokes are fastened to the tires 96 (as shown in Figures 1 and 2) and the inner tires 95—95 have spaced vertically disposed stanchioned 98 and trussed wires 99 (Figure 1). The external tires of the propeller portion of the said wheel B (and C) are also stanchioned and trussed like tires 95—95 and in addition to the wire spokes 97, there is a woven wire cloth 100 (Figure 2) covering the whole wheel in conformity to the shape of the wheel blades and fastened to the tire 96 and hubs 29 and 12 thereof, for the purposes of:

First: That an extremely light metallic canopy 101 may be used and put underneath said wire cloth.

Second: A wheel tired from hub to tire with this truss cloth cannot collapse should the tire break. The portion marked 102 of wheel B and C is a plane or stationary parachute to keep in balance the wheels when the said blades 35 and propeller blades 91 are working or open (Figure 2). The back or under lash of the raising blade 91 thrown against the already heavy resistant air pressure (when the ship is falling) thereunder, is more evenly fed or supplied to the power blade 35 by the use of the stationary plane 102, the wheel 31 (Figures 1 and 2), being the means by which the gates 34 (Figure 14) are severally opened and closed at will (Figure 10) and the adjacent grooved collar 36 on the tube 11, causes the wheel 31 to open and close said gates 34. The parachute wheel C is of the same construction, only smaller, to miss the under lash of wheel B. By back or under lash is meant that resisting force of air which opposes the falling of wheels —B— and —C— or the forward motion of wheel —A—. The hoisting and raising mechanism of this ship consists of the two rotatable parachute wheels B and C, said wheels revolving when necessary and constructed as heretofore described, around the concentrical shafts within their respective hubs. The wheel B is revolved to the right, by the medium of the shafts 9 and 10 (Figures 8 and 9) and pawling device 22 and 23, and by their respective gears 45 and 50, meshing their respective driving gears 46 and 51 clutched to shaft 21 on the main power shaft (Figure 1). The wheel C is revolved to the left by the shaft 7 and 8, pawled by the pawls 22 and 23 and rotated by their respective gears 19, 26 and 41 (Figures 5, 6, 7) and meshing their respective driving gears 20, 27 and 42, clutched to the power shaft 21, the shaft 6 being rigidly fastened to the hub of the parachute wheel C at 13, and the other two shafts 7 and 8 being pawled thereto. To control the parachute wheels B and C is very simple. The power (35) and raising (91) blades of wheels B and C are stationary. The valves 34 of the power blades 35 wheel B are operated by the lever 30, tube 11, wheel 31 and connecting rods 33, to open the valves 34 for the resistant air to escape. The valves 34 of the power blades 35 of wheel C are controlled by the spring 52. The propeller blades 91 of wheels B and C are controlled by the flop valves 34 and when driven by the power blades 35 are co-acting. They are also driven by the engines 5—5, in both cases the flop valves 34 normally remain closed or down forming tight parachutes, until each of the wheels B and C are rotated to a velocity that the resistant air pressure against the outside of the flop valves 34 of the propeller blades reaches a pressure greater than the inside resistant air pressure, which tends to open them, and allows the propeller blades 91 access to the outside air in order to raise the air ship or retard the "fall". In case of a "fall" the aviator can at will by the lever 30, tube 11, wheels 31 and connection rods 32, open the gates 34 allowing the resistant air pressure to escape to act on blades 35 (Figure 2) to rotate wheel B and when the wheels B and C revolve to a velocity with a greater resistant air pressure against said gates 34, outside, resistant air pressure under or inside, against said gates 34, of said parachute wheel, the resistant air pressure outside and against the gate 34 (Figures 2 and 14) raises the automatic flops on wheel C or hinged gates 34 on wheel B. They are used or operated similar to those used in the power blades 35, only that they flop inwardly and upwardly giving the raising blades 91 access to the outside air, forced in by the rapidly revolving wheels B and C, causing or allowing the raising blades 91 to tend to raise the ship or check the fall.

The wheel C on shafts 6, 7, and 8 rotates and is operated by the same means, only that the gates 34 of wheel C are held by the spring 52 (Figure 14) and open automatically at a required resistant air pressure applied, causing the air to escape and forcing the wheel to revolve and bring into action the co-acting raising blades 91, common to both wheels B and C, this wheel C revolves in the opposite direction from B. To overcome gyration of both wheels, and in a case of a "fall," the wheels B and C free themselves from the shafts 7, 8, 9 and 10 by a means of the pawls 22 and 23 (Figures 11 and 12) and thereby revolve independently around their respective shafts, relying wholly upon the resistant air pressure power supplied from the housing below to the power sail blades 35 to rotate the parachute wheels B and C sufficiently to give force or usefulness to the co-acting raising blades 91 to check the fall. The shaft 6, being riveted to the hub 12 at 13, must necessarily rotate said shaft 6 and gears 19 thereon, and should the aviator wish to change the position of the ship, he can by meshing the said gear 19 into mesh with gear 20 on shaft 21 and clutching it thereto, rotate the propeller wheel A, from the said shaft 21, the same as though the engines were revolving shaft 21. The wheels B and C, rotated by their several means of power, from the power shafts 21, keep, by the action of their raising blades 91, a body of compressed air sufficient to keep the air ship afloat. Their concentrical perpendicular shafts 6, 7, 8, 9 and 10 carrying and supporting the carriage (Figure 1) when in the air and the buoying power and rotation of said parachute wheels B and C, being above their load or carriage (Figure 1), prevent the ship from "turning turtle."

The parachute wheels B and C, running independently, keep the ship in equilibrium and the housed air pressure, beneath, passing against the power sail blades 35, (when the gates 34 are open) give rotation to the combined parachute wheels B and C and their co-acting raising blades 91, and also impart an elevating or retarding action to the fall of the air ship. The mechanical benefit or action of this device is in proportion to the force of the resistant air pressure against the power blades 35, as against the under lash of the co-acting raising mechanism, comprising blades 91 and that power is to the power lash as the falling velocity and number of revolutions, caused by the power sail portion of the wheels B (and C) as they utilize the escaping resistant air pressure housed thereunder, and as compared with the velocity and momentum of the blades 91, or under lash or raising and retarding force of the raising mechanism and the velocity of rotation of the raising blades 91, forced against the resistant air pressure already thereunder. It will be readily seen that the blades 91 have a resistant air force in addition to their rotary velocity and under lash and the rotary force of the raising blades 91 as they are propelling against an already present resistant air pressure adds greatly to their raising ability.

A, indicates the combination resistant air and wind pressure power sail wheel and co-acting propeller mechanism, as running independently or being run by the engines 5—5, through the trains of transmissions furnished to the general power shaft 21, and it is my mechanical intention and purpose by the combination of the power sail blades 71, said blades driving wheel A, independently of the power shaft 21, but resting and turning on shaft 67 mostly, and driven by wind and resistant air pressure power, to drive or whirl the propelling mechanism blades 82 by said wind and resistant air pressure power and with no friction between the forward lash and back lash mechanism of said wheel. To accomplish this purpose, I extend arms 81 to a greater radius making a greater wheel and circumference or tire 79 (and similar in construction to B and C) and in so doing it doubles the velocity and increases the propelling power by the square of that velocity of the propelling blades 82, as compared to the power blades 71, and this gives a greater resistant propelling power to the back lash mechanism, than the combined force or thrust of the wind and resistant air pressure against the power sail blades 71 and resistant air pressure against the ship's surface. Now I claim for wheel A that in high winds and resistant air pressure, that this helix movement, caused by the propeller blades 82, when propelling adds an additional resistant air pressure power for the sail blades 71, that will overcome the loss or used power force upon the sail, that it will make that advance movement of the ship, and in addition to that, that the power of the blades 71 and propelling power of the blades 82 are far in advance of the force or power that is required to overcome the resistant air pressure against the ship and the ship's mechanism. It is self-evident that the back lash of the blades 82, being twice the square of the velocity greater per square foot, than the forward lash of the sail blades 71, and resistant air pressure against the carriage (Figure 1) that the back lash must hold up and propel the air ship and sail wheel A, against the wind thrusts as though the power sail A (blades 71) were held against the said wind thrusts by a wind mill tower. The shafts 21 and 67 steadies the wheel A there on in the carriage (Figure 1) and said carriage is kept afloat by the parachute wheels B and C. Now the back lash of the propeller blades 82 (either rotated by the engines 5—5, or rotated by the wind power, by the sail blades 71), holds the sail wheel A up against the wind thrusts to give rotation to said wheel A by the air pressure against the sail and once in rotation and the propeller blades 82 propelling will withstand any wind thrusts or resistant air pressure that might oppose its advance and the rapid helix movement of the blades 82 is the direct cause in moving the air ship and that movement is the means of stopping the roar of the propeller wheel or blades and consequently producing a noiseless ship. The rudder 104 (Figure 1) being a four fin rudder will steer the ship up or down as well as right or left. The running gear 106, is to move the ship on land and upon the pontoons 105 in water.

*In operation.*

The aviator in the carriage (Figures 1 and 4) starts the engine (5—5) and communicates power by the several trains of transmissions, to the main power shaft 21 and by manipulating the several levers (not shown), to clutch the several trains of transmission or driving gears 46, 51, 42, 27 and 62 of both a single and double shaft drive (Figures 1 and 4) on and to the general power shaft 21, to set in rotation some one or all of the shafts (6, 7, 8, 9, 10) matching their respective gears mounted and pawled on the aforesaid shafts. The parachute power and co-acting propeller raising blades 91 of wheels B and C are rotated. After gaining the required altitude by the action of the raising blades 91 by slowing said wheels B and C just enough to overcome gravity, the craft stays at a required height, and as soon as shaft 21 starts, the pawls 63 (Figure 13) engage the hub of the sail wheel A, and set it in motion. He first frees the operating lever 78 that connects to the lever 76 in the annular groove collar 77, rigid on tube 75. The freeing of the operating lever 78, allows the tube 75 to work backward and forward as the resistant air pressure acts upon the back or larger half of blades 71 and feathering in a neutral position, between the wind and rotary resistant air pressure and at the same time he must free the operating lever 90 or set it in a neutral position. The said operating lever 90 connected to the lever 88 in the annularly grooved rigid collar 89 on tube 85, which when shifted moves the multiple rack 84, loosely journaled on shaft 21 by roller 87, the pin 86 is rigidly fastened in tube 85, the rack 84 meshing the several gears 83 on the arm of 81 that shifts the propeller blades 82 and by setting the propeller blades 82, in an active or propelling position the ship may be steadied against a wind thrust or ready to advance immediately. The aviator at his will may, by operating the lever 78 bring the power sail wheel blades 71 up into the wind (if any) or resistant air pressure, should the ship be moving at a higher rate of speed and thereby utilize the resistant air pressure as though it were wind power to rotate the propeller blades 82, in assisting the engine to rotate the wheel A, blades 82, and propeller and should the engine stop and the ship "fall", bringing in action or rotation the parachute wheels B and C, by the automatic gates 34, opening (Figures 14 and 2) said gates 34 allowing the housed resistant air pressure to pass out and automatically rotate the parachute wheel C to keep the ship in an upright position or in equilibrium and beneath the wheel C, gaining resistant air pressure, sufficient to immediately open the flaps 34, (Figure 14) automatically freed by the over balancing pressure against the spring 52, allowing wheel C to operate by the housed resistant air pressure passing against the blades 35 and out through the aperture to set in rotation first the said wheel C and the co-acting raising blades 91 therein (Figure 2) to check the fall of the ship and the aviator may by the operating lever 30 (Figure 10) and (Figure 4) and by means of the wheel 31 and connecting rods 32 (Figures 1 and 2) open the gates 34 (Figures 2 and 14) of the parachute B power sail blades 35. To rotate the wheel B and the co-acting raising blades 91, to still retard the air ship from falling at too high rate of speed and in case that a strong wind does blow, the aviator, may, by the operating lever 78 (Figure 13) and connecting levers 76, journaled in the angular grooved collar 77, rigid on tube 75, shift the tube 75 and governor wheel 74 and through the connecting rods 73 tilt the power blades 71 bringing them into action by the wind blowing against them and rotating said wheel A and coacting propeller blades 82. The said propeller blades 82 hold the sail wheel A, up against the wind thrust (as though the said sail wheel A was on a wind mill tower) to give wheel A rotation by the forward lash and said rotation of the wheel and co-acting peripheral propeller blades, by their helix movement advances the ship. Should the general power shaft 21 be dead or not in rotation, he may connect gear 19 on shaft 6 to the gear 20 and clutch said gear to shaft 21 and rotate the wheel A and its propellers 82 to shift the ship to a favorable landing place, by the power furnished by the parachute wheel C, rotated by resistant air pressure in falling, or should the engine be running the said parachute wheels B and C, can be governed to suit the will of the aviator.

By clutching the respective gears of shafts 6, 7, 8, 9 and 10 to their respective gears on the general power shaft to rotate the said wheels B and C and their respective raising blades 91 (common to both wheels B and C) to stop, raise or lower the ship at will by the operating lever or by the automatic working devices thereon, and when the ship is traveling at a high rate of speed, the aviator, may by the operating lever 78, through its controlling means, bring up into contact, the power sail blades 71, with the resistant air pressure now against the ship and making said resistant air pressure a power means or forward lash and relieving the ship of said resistant air pressure, and the said forward lash rotating and adding the power of the sail wheel A to assist and to relieve the engines. The speed of the air ship may be governed by the pitch of the propeller blades 82 and angle of the power blades 71.

The aviator having operated the engines and sail wheel A, to his satisfaction, he clutches the driving gears on shaft 21 to the gears on the perpendicular shafts 6, 7, 8, 9 and 10 to give the parachute wheels B and C, a sufficient rotation to open the automatic blades 34 of the raising blades 91 governed by the springs 52, opening said gates inwardly instead of outwardly, allowing the oppositely revolving parachute raising mechanism to elevate the ship to a required altitude and then by slackening the speed, he may proceed and as he increases his advancing speed he can slacken the speed of the parachute wheels, and should he be traveling windwardly, he just utilizes the wind power as if it were resistant air pressure and if strong enough he may slacken the speed of the engines 5—5 to a minimum. If going lee-wardly he may, if the engines do not work successfully, close or make a tight sail wheel A and float, sail or drift, and should the engines 5—5 stop entirely, he may reach a landing place, by using the wheel C, through shaft 6 and gearing 19 and 20 to rotate, the power shaft 21 and propeller wheel A. By the resistant air pressure against the blades 35 and by controlling wheel B by the operating levers 30 (Figures 4 and 10) he may land the ship in safety, while sailing, and should the sail wheel A be crippled he can support his ship by the parachute wheels B and C, and stop the sail wheel A for repairs by reversing the engines 5—5 and drive shaft 21, that action releasing the pawls 63 from engagement of sail wheel A and by clutching gears 46 and 51 to shaft 21, reverses the parachute wheel B, through gears 45 and 51, and that action turns the power sail wheel B and blades 35 backwardly and by opening the gates 34 by lever 30 the said blades 35, can be changed into raising blades to sustain the ship in an emergency (and release wheel C).

Having thus described the invention what I claim as new and desire to secure by Letters Patent is:—

1. In an air ship, the combination with a carriage, of a pair of superimposed parachute power and lifting wheels mounted so as to rotate in opposite directions on concentric shafts, supported upon said carriage, each of said parachute power and lifting wheel embodying in its construction an inner series of stationary power blades and an outer series of stationary lifting blades with means for controlling the passage of air between adjacent blades of each of the inner and outer series, substantially as described.

2. In an air ship, the combination with a carriage, of upper and lower superimposed parachute power and lifting wheels, the upper wheel being of greater diameter and extending beyond the periphery of the lower wheel, concentric shafts upon the carriage giving independent rotation to the wheels in opposite directions, a power device supported by its carriage to rotate the shafts and the parachute wheels thereon, and a pawl and ratchet mechanism between the shafts and wheels substantially as described.

3. In an air ship, the combination with a carriage, of a pair of superimposed parachute power and lifting wheels mounted so as to rotate in opposite directions, concentric shafts supported by the carriage and connecting with said parachute wheels, pawl and ratchet mechanism between the shafts and the wheels, a power and propeller wheel mounted upon the carriage on a shaft transverse to the concentric shafts carrying the parachute wheels, a power device for imparting motion to said parachute wheels and said power and propeller wheel, and interconnecting mechanism whereby said parachute wheels and said power and propeller wheel may be operated independently by wind power, or by the said power device, substantially as described.

4. In an air ship, the combination with a carriage, of a pair of superimposed parachute power and lifting wheels mounted so as to rotate in opposite directions on concentric shafts supported upon said carriage, each parachute wheel embodying in its construction an inner series of stationary power blades and an outer series of stationary lifting blades with means for controlling the passage of air between adjacent blades of each of the inner and outer series, a pair of concentric shafts mounted upon the carriage and supporting said parachute wheels, a power and propeller wheel mounted upon the carriage on an axis transverse to the axis of the concentric shafts of the parachute wheels, said power and propeller wheel having an inner series of pivoted power blades with means for automatically controlling the same by wind pressure, and said wheel also having an outer series of propeller blades, with means for manually controlling the inclination of said propeller blades, a power device supported upon the carriage, gearing for transmitting power from the power device to the parachute wheels and to the power and propeller wheel, and mechanism for operating said parachute wheels, said power and propeller wheel and said power device independently or in conjunction with each other, substantially as described.

In testimony whereof, I have hereunto signed my name to this specification in the presence of two subscribing witnesses.

OLIN WENDELL BENSTER.

Attest:
J. J. WALDVOGEL,
GEO. W. FLUCKEY.